United States Patent
Stumpe et al.

(10) Patent No.: US 6,202,018 B1
(45) Date of Patent: Mar. 13, 2001

(54) PROCESS AND DEVICE FOR CONTROLLING A VEHICLE BRAKE SYSTEM

(75) Inventors: Werner Stumpe; Juergen Braeuninger, both of Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/055,687

(22) Filed: Apr. 6, 1998

(30) Foreign Application Priority Data

Apr. 18, 1997 (DE) .................................. 197 16 291

(51) Int. Cl.[7] .................. B60T 8/58; B60T 13/74
(52) U.S. Cl. ...................... 701/70; 303/20; 188/181 T
(58) Field of Search .................. 701/69, 70, 78, 701/83, 89, 75; 303/3, 20; 188/156, 158, 181 T

(56) References Cited

U.S. PATENT DOCUMENTS

| | | | |
|---|---|---|---|
| 4,338,667 | * 7/1982 | Cook et al. | 364/426 |
| 4,750,125 | * 6/1988 | Leppek et al. | 364/426 |
| 5,273,349 | * 12/1993 | Kidston | 303/100 |
| 5,315,518 | * 5/1994 | Lin | 364/426.02 |
| 5,366,281 | * 11/1994 | Littlejohn | 303/3 |

FOREIGN PATENT DOCUMENTS 42 14 644   11/1993 (DE) .

OTHER PUBLICATIONS

J. Werde et al., "Electronically controlled compressed–air braking system for commercial vehicles", IMechE 1992, pp. 113–121.

* cited by examiner

*Primary Examiner*—Tan Nguyen
*Assistant Examiner*—Dalena Tran
(74) *Attorney, Agent, or Firm*—Kenyon & Kenyon

(57) ABSTRACT

A process and device for controlling a vehicle brake system, in which a central controller and a plurality of other decentralized control units are provided. This system is initialized from the central controller over the communication connecting the control units, at least by transferring corresponding addresses. When the brake pedal is actuated before or during the initializing phase, the brake system is electronically controlled as a function of specified reference values even if the system initialization has not yet been carried out or was not completely carried out.

10 Claims, 3 Drawing Sheets

PROCESS AND DEVICE FOR CONTROLLING A VEHICLE BRAKE SYSTEM

FIELD OF THE INVENTION

The present invention relates to a process and device for controlling a vehicle brake system.

BACKGROUND INFORMATION

A conventional brake system is described in "Elektronisch geregelte Druckluftbremsanlage für Nutzfahrzeuge" (Electronically Controlled Compressed Air Braking System for Commercial Vehicles), Fisita 1992, by J. Wrede, W. Stumpe, I. Grauel, J. Bräuninger, A. Schlichenmaier and H. Kächele. This conventional brake system includes a central controller having at least one microcomputer mounted thereto. Pressure regulation modules are provided in this conventional brake system for controlling the wheel brakes. The pressure regulation modules function as a pressure regulation valve and include a microcomputer. Thus, the pressure regulation modules control pressure in the associated wheel brake and generate sensor signals. The central controller is connected to the at least one microcomputer of the pressure control modules for providing information and data exchange via a communication system (e.g., "CAN"—Controller Area Network). The conventional brake system has pneumatic emergency brake circuits which can be activated, instead of the electrical system, in case of a malfunction, and which enable a control of a braking force by a driver in a conventional pneumatic manner.

When the voltage supply is switched on, the conventional brake system is initialized according to a predetermined procedure. In this initialization phase, the pressure control modules are assigned successive addresses by the central controller, which assigns the individual components their respective predetermined application. As an example, an address is assigned to the pressure control module corresponding to the left front wheel, which is specified as a left front wheel module. Depending on this address, the corresponding reference values and functions (e.g., ABS, etc.) are assigned to this pressure regulation module. An example of this type of initializing process is described in German Patent Application No. 42 14 644. Only after the initialization procedure has been completed and the electronic brake system is completely configured, the electronic brake system becomes available. Actions that lead to an increase in the braking force during a brake pedal actuation by the driver during the initialization phase are not described therein.

What is especially problematic is that the electronic system is switched on during the braking force, for example, after an electrical supply interruption (e.g., because of a loose contact). Thus, the electronic brake system is not available during a subsequent initialization phase.

Therefore, it is one of the objects of the present invention to provide measures which improve an operating behavior of an electronic brake system during the initialization phase after the voltage supply is switched on and/or after the voltage supply is switched on again.

SUMMARY OF THE INVENTION

According to the present invention, it is advantageous for an operation of the electronic brake system to be ensured during the initialization phase, even if this operation is limited. Thus, the braking force is incremented electronically in an advantageous manner, even during the initialization phase. It is also advantageous that, during an interruption of the electrical supply during the braking action, the electronic brake system can still be controlled electronically, possibly with a limited function. Accordingly, the driver does not notice a brief interruption of the electrical supply since in a normal braking situation, the brake control occurs electronically (even during the initialization phase). Switching to a pneumatic emergency brake circuit, and transition difficulties and limitations associated with such switching, is not required, at least during brief interruptions.

According to the present invention, it is also advantageous that with identical pressure regulation modules, the brake control occurs at a predetermined reference value dependent on the brake pedal actuation by the driver, which is the same for all identical pressure regulation modules. Therefore, the brake control is advantageously limited for the duration of the initialization phase in such a way that a locking of wheels (in particular, the rear wheels) is unlikely.

In the systems having different construction types of the front axle and rear axle modules, this module is given a predefined assignment when the brake system is installed in the vehicle. In these brake systems, it is advantageous that during the initialization phase, different brake pressure reference values are output to the front and rear axle modules which consider the specified brake force distribution (in particular, the load-dependent brake force distribution).

The output reference pressure values are regulated in the pressure regulation modules that have not yet been initialized using the pressure control circuit implemented therein or implemented according to an open control chain by assigning the control signal variable for the valve arrangement as a function of the output reference pressure values. In this manner, a braking effect desired by the driver can also be electronically set in the initializing phase.

DETAILED DESCRIPTION

Figure 1:
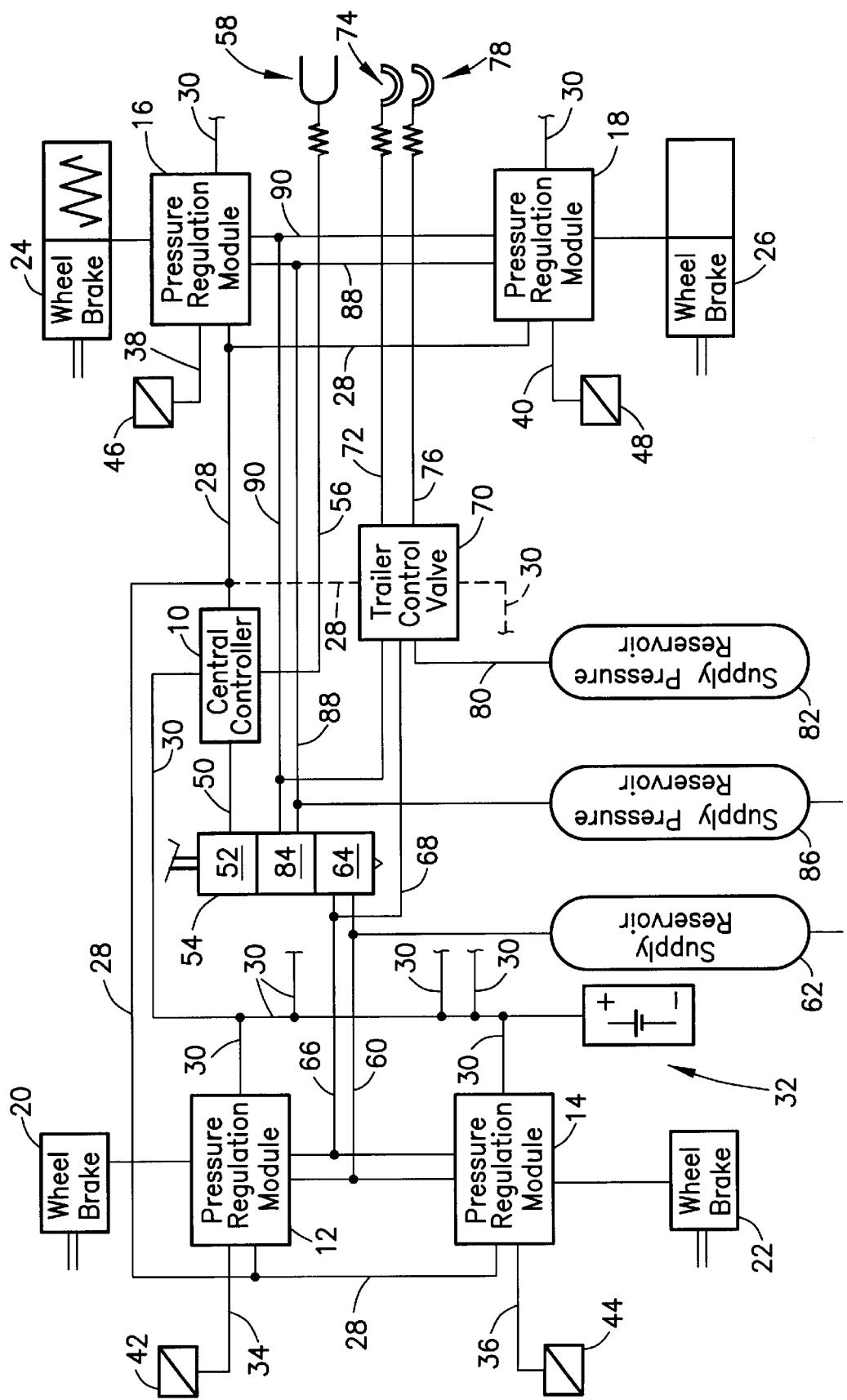
FIG. 1 shows a block diagram of an electronically controlled brake system according to the present invention, which illustrates an exemplary electronically controlled compressed air brake system.

FIG. 1 shows an block diagram of an electronically controlled brake system illustrating an exemplary electronically controlled compressed air braking system with emergency brake circuits for a dual axle vehicle with trailer connection. The electronically controlled braking system includes a central controller 10, which has at least two microcomputers. Decentralized pressure regulation modules 12, 14, 16, 18 are also provided and are each assigned to a respective wheel brake 20, 22, 24 and 26 of a vehicle. Central controller 10 is connected via a communication system 28 (e.g., "CAN"—Controller Area Network) to pressure control modules 12, 14, 16, 18. Central controller 10 and pressure control modules 12, 14, 16, 18 are supplied, via a line system 30, with an operating voltage by a voltage source 32. In order to detect injected brake pressures and (if necessary) to detect further variables (e.g., axle loads, wheel speeds, etc.), lines 34, 36, 38, 40 are routed from corresponding measuring devices 42, 44, 46, 48 to pressure control modules 12, 14, 16, 18. Central controller 10 is also connected by via a line 50 to an electrical part 52 of a brake value transducer 54. A line 56 leads from central controller 10 to an electrical connector 58 for controlling the trailer brake system using a trailer.

A pneumatic portion of the brake system according to the present invention includes two brake circuits for the front and rear axles. Pressure control modules 12, 14 assigned to front axle wheel brakes 20, 22 are provided with a supply pressure emerging from a supply reservoir 62 via lines 60. Control lines 66 extend from a pneumatic part 64 of brake value transducer 54 to pressure control modules 12, 14. In addition, line 68 (extending from line 66) runs to a trailer control valve 70 for controlling the brake system of the trailer. A pneumatic control line 72 extends from trailer control valve 70 and connects with a first hose coupling 74. Supply line 76 also extends from trailer control valve 70 and connects with a second hose coupling 78. Trailer control valve 70 is connected to a supply pressure reservoir 82 via a line 80. Alternatively, trailer control valve 70 can also be connected to voltage supply 32 and to CAN 28, and be included in the initialization. A second brake circuit is formed by a second pneumatic part 84 of brake value transducer 54, a supply pressure reservoir 86, a supply line system 88 and a pneumatic control line system 90. Supply lines of the supply line system 88 and control lines of the pneumatic control line system 90 extend from brake value transducer 54 to pressure control modules 16, 18, which are assigned to rear axle wheel brakes 24, 26.

In a preferred embodiment according to the present invention, electric part 52 of brake value transducer 54 provides a signal to central controller 10. This signal provides a reference value for the degree of actuation of the brake pedal. The signal provided by electric part 52 is generated by central controller 10, and (if necessary) is formed as a function of further operating variables (i.e., axle loads, individual wheel variables, vehicle deceleration, etc.), reference pressure and brake torques or slip values for the individual wheel brakes and/or for the trailer according to predefined curves or maps. These reference values are supplied via communication system (CAM) 28 to individual pressure regulation modules 12, 14, 16, 18, which regulate pressure in respective individual wheel brakes 20, 22, 24, 26 as a function of the reference value. If there is a malfunction in the electrical part of the brake system, the brake system (or at least the defective electrical part) will be switched off and the pneumatic emergency brake circuit(s) is (are) switched on. In an emergency brake operation, the driver specifies (using pneumatic parts 64, 84 of brake value transducer 54, and via control line 66 and/or control line 90) the wheel brake pressure in individual wheel brakes 20, 22, 24, 26, which is then injected by respective pressure regulation modules 12, 14, 16, 18 into respective wheel brakes 20, 22, 24, 26 if the electrical control is switched off.

The above-described procedure can also be used with various electro-pneumatic brake systems, electro-hydraulic brake systems or brake systems with purely electrical application having similar or dissimilar designs as opposed to the design shown in FIG. 1. One of the important features of the present invention is that the control system has an intelligence that the control system shares with the respective brake system, (e.g., at least one central microcomputer and at least two microcomputers assigned to the vehicle wheels are provided for brake system control).

When the voltage supply is switched on, e.g., when the ignition switch is closed or after interruptions, generally an initialization of the brake system takes place. An example for an initialization process is also described in the above-mentioned publication and German Patent Application No. 42 14 644. Thereafter, when the voltage supply is switched on, the pressure regulation modules are successively activated by the central controller and the module just activated is addressed using the central controller with the lines connecting the modules. Another type of initialization includes a successive transfer of different data strings from the central controller to individual modules, with the various data strings being used for addressing the respective module. The respective point of use of the module is specified by the address assigned by the central controller to the individual module. Based on the addresses, the individual modules determine their respective point of use and select their respective functions. Depending on the address that was assigned, the respective pressure regulation module receives or outputs information and executes functions (for example, outputting a left front wheel speed value, executing a left front ABS control, receiving a left front pressure reference value, etc.). The duration of the successive initialization of the pressure regulation module is for a predetermined time period, during which the brake system is not fully functional. Only after the entire initialization has been executed and all the components have been initialized, does the electronic brake system become fully operational. Accordingly, operation of the electronic brake system is ensured during a brake pedal actuation by the driver even during the initialization phase. This advantageous solution is especially advantageous in the case of short-term interruptions of the electrical supply (e.g., loose contacts). An activation of the purely pneumatic emergency brake circuit during the initialization phase (instead of the electronically controlled brake system) can lead to transitions in the braking action that are noticeable to the driver, in addition to significant limitations in performing the braking action.

Therefore, according to the present invention, each component performs at least a portion of its function under the electronic control (because of its special construction type) can be performed without further initialization and/or can be performed by special control or regulation measures immediately when electrical supply 32 is switched on. The initialization executes in the background or continues at the end of a current braking action. After the initialization is completed, the electronic brake system is fully operational.

If the front axle components are differently constructed from the rear axle components, an axle load dependent brake force distribution can be carried out immediately and electronically. In this case, individual wheel functions, (e.g., ABS function) are only available when initialization is complete and the components have been assigned to the respective left and right vehicle sides.

In another advantageous embodiment according to the present invention, electronic braking can be performed even during the initialization by specifying the same (and, if necessary limited) reference pressure values without assigning the components to the individual known wheels or axles.

As a result, even if the electrical supply is interrupted, a controlled electronic braking action can continue to be executed, possibly with a limited function. With a normal braking action that does not require the fully functional electronic brake system (e.g., ABS), a short interruption of electrical supply is not noticed by the driver, since, e.g., an electronically controlled brake force distribution is regulated immediately after the electrical supply is again switched on, even if the initialization procedure has not yet been completed.

Figure 2:
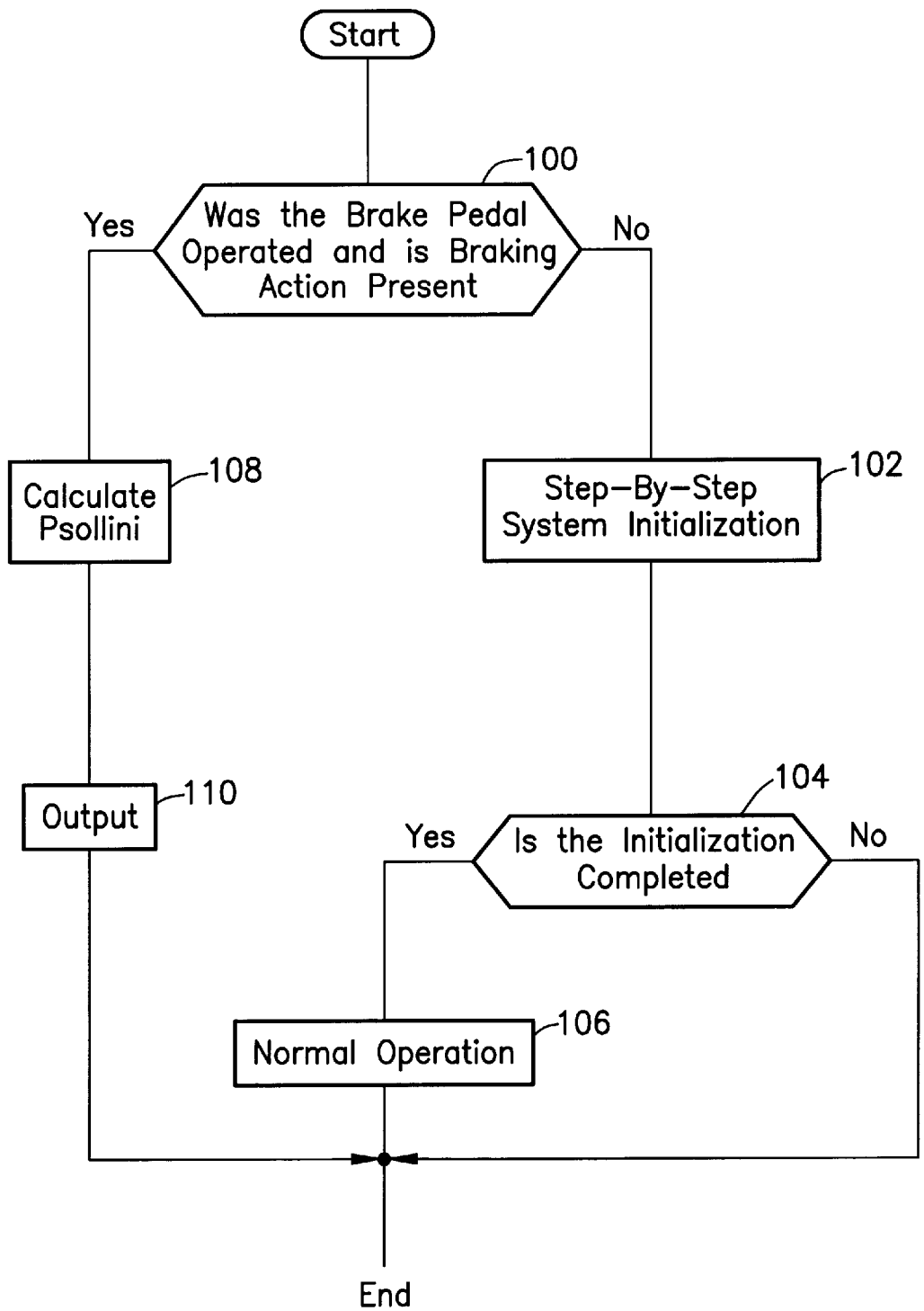
FIG. 2 shows a flow chart of a mode of operation of a central controller illustrated in FIG. 1, during an initialization phase.
Figure 3:
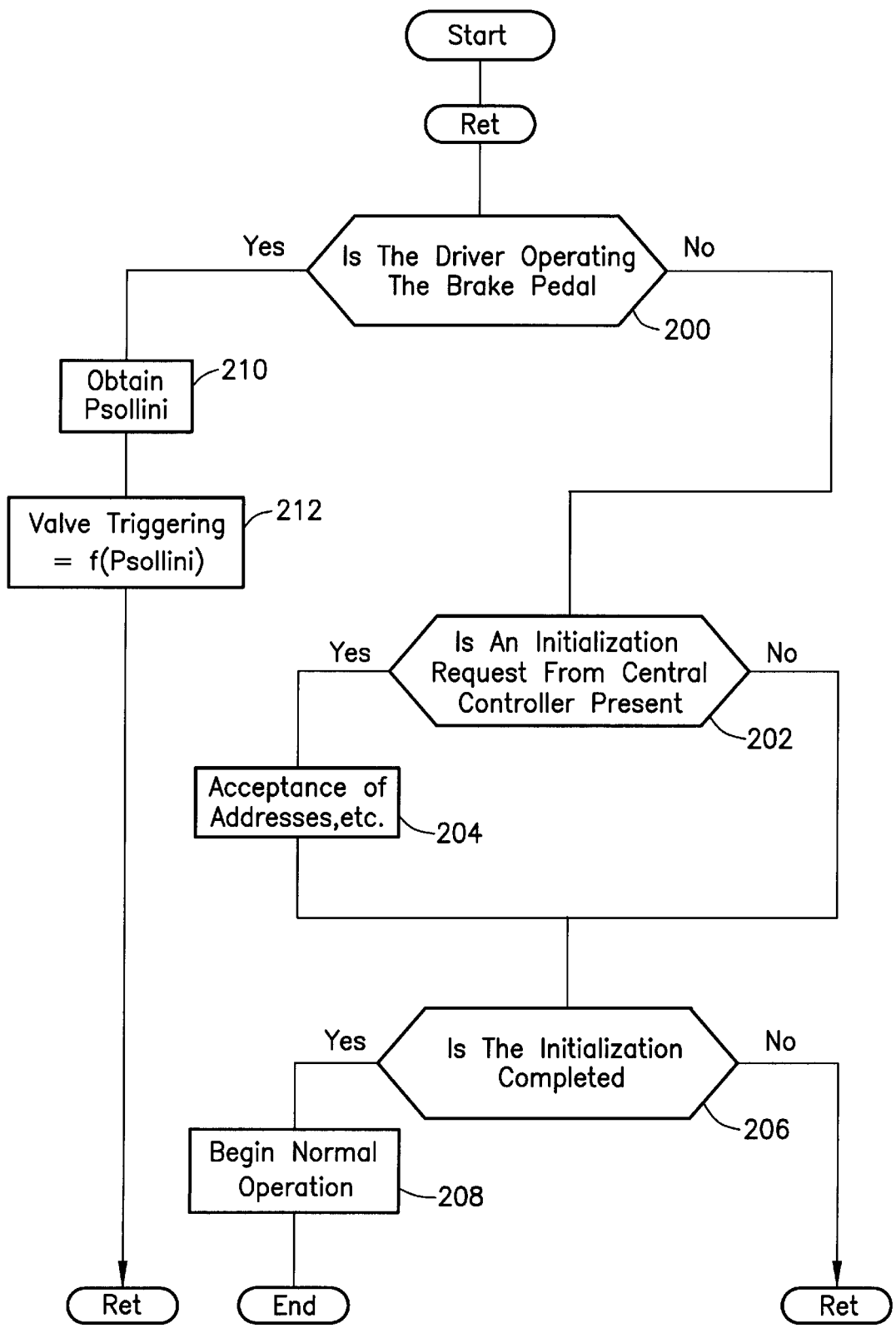
FIG. 3 shows a flow chart of a selected pressure control module illustrated in FIG. 1, during the initialization phase.

According to the present invention, operational procedures (illustrated in a flow chart form) executed by central controller 10 are shown in FIGS. 2 and 3. These procedures represent computer programs which are also executed in a selected controller assigned to a wheel brake.

FIG. 2 shows a flow chart of the computer program being executed by central controller 10 after voltage supply 32 is switched on and/or switched on again. This computer program represents the initialization phase of the electronic brake system and will execute at predetermined points in time until the initialization phase is completed.

After the computer program begins executing, in first step 100 there is a check of whether the driver has operated the brake pedal and whether a braking is thus present. In the preferred embodiment according to the present invention, this occurs by checking a brake pedal switch and/or checking the sensor signals that record brake pedal actuation. If there is no brake actuation, the step-by-step system initialization is carried out in step 102, using which central controller 10 successively carries out initialization communication with the individual system components (e.g., with each program run to another) and provides the appropriate addresses to these components. In step 104, for example, it is determined (using the flags to be set at the end of the initialization phase for each individual component) whether the initialization process is completed, i.e. whether all components have been initialized. If this is the case, normal operation (in step 106) begins, the programs carrying out normal operation are called, and the initializing program is completed. If the initializing phase has not yet been completed, the procedure shown in FIG. 2 is executed at the next run time and the initialization phase continues in step 102. If, in step 100, it is determined that the driver is operating the brake pedal, the initialization phase is either interrupted or not started. Instead, in step 108, there is a calculation of the reference brake pressures $P_{SOLL\ INI}$ used as an electronic control basis of the brake process when the system is not initialized.

Depending on the design of the brake system, these specified pressures are formed in different ways. If the components are designed at least partially differently according to their function type so that at least partially specific functions can be assigned to the components without initialization, the calculation of the reference pressure values during the initialization phase is performed as a function of this design-dependent distribution. In a preferred embodiment of a brake system according to the present invention, the components for control of the front axle wheel brakes are designed differently from the components which control the rear axle brakes. Accordingly, because of the degree of the brake pedal actuation, during the initialization phase, the reference brake pressures can be formed separately for the front axle and for the rear axle as a function of, e.g., an axle-load dependent brake force distribution according to predetermined maps, curves and/or tables. If, in another embodiment according to the present invention, all of the components are identical so there is no criterion for assignment of functions without the initialization phase, the same brake reference pressure value can be formulated for all of the wheel brakes and is limited to values that do not lead to overbraking of the rear axle under normal conditions. In this case, the reference pressure values are formed as a function of the degree of the brake pedal actuation as a function of the predetermined curves, maps or tables. After formation of the reference pressure values in step 108, the reference pressure values are output over the communication system to the individual components (step 110). Thereafter, the program shown in FIG. 2 ends and restarts again at the next run time.

In the embodiment shown in FIG. 2, the initialization phase during brake actuation is interrupted and/or delayed for the present time. In another embodiment according to the present invention, the electronic brake control and system initialization are performed at the same time. In particular, central controller 10 executes an initialization communication to a component after the reference pressure calculation and output of the reference pressure values, and replaces the prepared system addresses. In the next program run, the reference pressure values for the initialization phase are recalculated and another component is initialized. After the end of initialization, normal operation begins and the reference values are determined according to this procedure shown in FIG. 2. In the case where the two reference values are different, the transition from the initializing phase into normal operation can be smoothed by a suitable filter function in the reference value (e.g., by a low-pass filter or a ramp-up).

FIG. 3 shows a flow chart of the computer program being executed by central controller 10 which takes place in an area of the individual components. The procedure illustrated therein is initiated by switching on voltage supply 32. For example, voltage supply 32 is switched on by closing the ignition switch, by brake activation or by an appropriate initialization request from central controller 10. The procedure shown in FIG. 3 executes at predetermined times after voltage supply 32 is switched on. In first step 200, analogous to step 100, there is a determination of whether the driver is operating the brake pedal. If this is not the case, the initialization phase is conventionally initiated. Thereafter, there is a check in step 202 if an initialization request from central controller 10 present. If so, according to step 204, the address transferred and the functions reported are taken over and communication with central controller 10 is initiated. Thereafter, if there is a negative response in step 202, there is a check in step 206 of whether the initialization phase has completed. In the preferred embodiment according to the present invention, this occurs, as also in step 104 (FIG. 2), using flags or an appropriate report from the central controller. If the initializing phase has completed, the procedures controlling normal operation are called and the initialization program ends (step 208). If there is a negative response in step 206, the program part re-executes at predetermined time. If step 200 shows that the brake pedal is activated, the reference value $P_{SOLL\ INI}$ is retrieved (step 210). In subsequent step 212, valve control is formed as a function of this reference value $P_{SOLL\ INI}$, preferably within a pressure control circuit under consideration of the actual pressure. After step 212, the program restarts at the next run time.

Analogously to the flow chart shown in FIG. 2, the initialization phase in FIG. 3 is also interrupted during the brake activation. In another embodiment according to the present invention, the initialization phase and the control tasks are executed in parallel so that the initialization phase is carried out following the control tasks.

In addition to determining the pressure reference values, the brake force reference values, brake torque reference values, slip reference values, etc. are determined and regulated, depending on the design of the brake system.

If the configuration of the brake system that is executed in the initialization phase is not permanently stored, the procedure described above is executed each time voltage supply 10 is switched on. If the configuration is permanently stored, the procedure will be executed, e.g., after a specific operating time and/or after the battery has been disconnected (initial start-up).

What is claimed is:

1. A process for controlling a brake system of a vehicle, the brake system including a central controller and a plurality of secondary control units, each of the secondary control units being associated with a corresponding one of a plurality of wheel brakes of the brake system, the process comprising the steps of:

initializing at least one non-initialized control unit of the secondary control units using the central controller in an initialization phase;

forming, with the central controller, at least one reference value as a function of a brake pedal actuation when a voltage supply is switched on;

providing the at least one reference value from the central controller to the at least one non-initialized control unit of the secondary control units; and controlling the wheel brakes as a function of the at least one reference value when the initialization phase has not been completed.

2. The process according to claim 1, wherein the initializing step includes a substep of successively assigning addresses to each of the secondary control units.

3. The process according to claim 1, wherein the secondary control units control the at least one reference value in a control circuit by controlling the wheel brakes.

4. The process according to claim 1, wherein, if the wheel brakes are activated during the initialization phase, the initialization phase is interrupted and the wheel brakes are electrically controlled as a function of the at least one reference value.

5. The process according to claim 1, further comprising the step of:

if the brakes are actuated at least one of during the initialization phase and before the initialization phase, controlling the vehicle brake system in parallel with the initializing step.

6. The process according to claim 1, wherein, if the vehicle brake system is not initialized, and if a functional assignment of front and rear axle brake modules of the secondary control units is previously determined, the at least one reference value is formed as a function of a predetermined axle-load-dependent brake force distribution between a front axle and a rear axle.

7. The process according to claim 1, wherein, if all of the secondary control units are identical, the at least one reference value is the same for all of the secondary control units.

8. The process according to claim 1, further comprising the step of:

after the initialization phase, initiating a complete operation of the vehicle brake system.

9. The process according to claim 1, further comprising the step of:

smoothing a transition formed when the brakes are controlled before, during and after the initialization phase, so that the driver does not perceive an abrupt transition.

10. A device for controlling a brake system of a vehicle, comprising:

a central control unit;

a plurality of secondary control units, each of the secondary control units associated with a corresponding one of a plurality of wheel brakes of the brake system, the central control unit communicating with the secondary control units via a connection, wherein the central control unit initializes a further unit of the secondary control units by assigning an address to the further unit for initializing the brake system, wherein the central control unit forms at least one reference value after a voltage supply is switched on and when a brake pedal is actuated by a driver of the vehicle, wherein the central control unit provides the at least one reference value to the secondary control units if the secondary control units have not yet been initialized, and wherein the brake system is controllable as a function of the at least one reference value.

* * * * *